United States Patent [19]

Yagi

[11] Patent Number: 4,667,540
[45] Date of Patent: May 26, 1987

[54] SHIFT SHOCK ALLEVIATING APPARATUS AND METHOD FOR AUTOMATIC TRANSMISSION

[75] Inventor: Youichi Yagi, Yokosuka, Japan

[73] Assignee: Nissan Motor Co., Ltd., Yokohama, Japan

[21] Appl. No.: 704,277

[22] Filed: Feb. 22, 1985

[30] Foreign Application Priority Data

Feb. 24, 1984 [JP] Japan .................. 59-32643

[51] Int. Cl.$^4$ .......................................... B60K 41/06
[52] U.S. Cl. .................................... 74/866; 74/867; 74/877
[58] Field of Search ............. 74/866, 867, 843, 856, 74/861, 862, 865, 877; 192/0.075, 0.076, 0.084; 364/424.1

[56] References Cited

U.S. PATENT DOCUMENTS

| | | |
|---|---|---|
| 3,710,630 | 1/1973 | Sumiyoshi et al. ............. 74/866 X |
| 3,710,647 | 1/1973 | Dach et al. ..................... 74/866 X |
| 3,719,096 | 3/1973 | Sprague et al. ................ 74/866 X |
| 3,763,720 | 10/1973 | Aono et al. .................... 74/866 X |
| 3,882,740 | 5/1975 | Forster et al. ................. 74/866 |
| 3,942,393 | 3/1976 | Forster et al. ................. 74/862 X |
| 4,274,306 | 6/1981 | Yokoi et al. ................... 74/866 |
| 4,394,827 | 7/1983 | Kubo et al. .................... 74/865 X |
| 4,431,095 | 2/1984 | Suga ............................... 192/3.31 |
| 4,485,443 | 11/1984 | Knodler et al. ................ 74/866 X |
| 4,488,456 | 12/1984 | Taga et al. ..................... 74/866 |
| 4,502,354 | 3/1985 | Suzuki et al. .................. 74/866 |
| 4,519,723 | 5/1985 | Shimizu et al. ................ 74/862 X |
| 4,582,182 | 4/1986 | Takeda et al. .................. 192/3.31 |

FOREIGN PATENT DOCUMENTS

| | | |
|---|---|---|
| 2124024 | 6/1982 | Fed. Rep. of Germany . |
| 55-24223 | 2/1980 | Japan ................... 74/867 |
| 56-127856 | 10/1981 | Japan . |
| 58-137652 | 8/1983 | Japan ................... 364/424.1 |

Primary Examiner—Rodney H. Bonck
Assistant Examiner—Dwight G. Diehl
Attorney, Agent, or Firm—Schwartz, Jeffery, Schwaab, Mack, Blumenthal & Evans

[57] ABSTRACT

A shift shock alleviating apparatus is disclosed wherein an engagement force with which a friction element is engaged is controlled to cause an engine to change its revolution speed at a rate which is proportioned to a target rate of change in engine revolution speed after a predetermined condition is satisfied after a command for a shift is generated.

5 Claims, 18 Drawing Figures

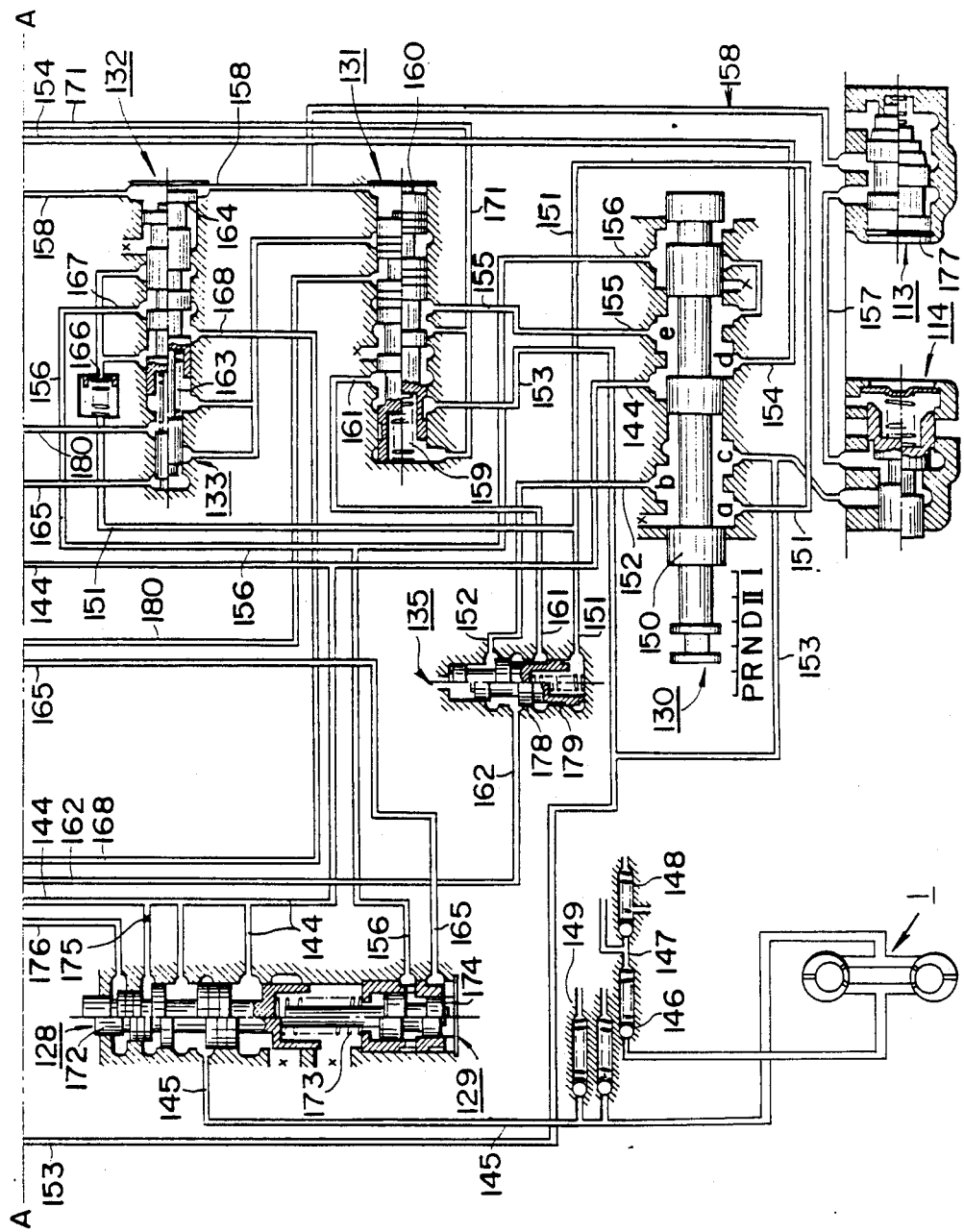

SHIFT SHOCK ALLEVIATING APPARATUS AND METHOD FOR AUTOMATIC TRANSMISSION

BACKGROUND OF THE INVENTION

The present invention relates to an apparatus and a method for alleviating or reducing shocks occurring in effecting a shift in an automatic transmission.

Automotive automatic transmissions are known wherein an appropriate gear is automatically selected for vehicle speed and engine load (throttle opening degree, for example) in accordance with a predetermined shift schedule or pattern and an upshift or a downshift to the selected gear is effected for smooth running of the vehicle.

Commonly, the automatic transmission effects a shift with engine load (engine throttle opening, for example) unchanged. Particularly, an upshift is effected with the throttle kept open, viz., with an accelerator pedal kept depressed. The fact that the upshift is effected with the acclerator pedal depressed causes the occurrence of substantial shocks in effecting the upshift. Referring to FIG. 11, there is illustrated how substantial shocks are produced in effecting a 2-3 upshift. It will be readily understood from FIG. 11 that the engine rapidly drops its revolution speed during a period from $t_1$ to $t_2$ as indicated by phantom line x and at the same time the transmission output shaft torque has a peak as indicated by phantom line y. This torque peak which is higher by $T_1$ than the level assumed by the transmission output torque after the completion of the shift, causes occurrence of substantial shocks. Similarly, in the case of effecting a 1-2 upshift as illustrated in FIG. 13, the engine rapidly drops during a period from $t_3$ to $t_4$ as indicated by phantom line x' and at the same time the transmission output shaft torque has a peak as indicated by phantom line y'. This peak is higher by $T_2$ than the level which the transmission output shaft torque assumes after completion of the shift, and this torque peak causes the occurrence of substantial shocks.

The peak torque y or y' is caused by a rapid change in torque that is transmitted to the trasnmission output shaft due to a rapid change in the engine revolution speed as indicated by the phantom line x (in FIG. 11) or x' (in FIG. 13). The magnitude of the peak torque increases in proportion to an increase in engine load (throttle opening degree or depression degree of accelerator pedal, for example).

In order to suppress the peak torque as discussed above, published Japanese Pat. No. 46-2466 discloses a measure wherein fuel supply to the engine is restrained in effecting an upshift so as to cause a drop in the engine torque. This measure, however, is not satisfactory because a drop in engine revolution speed due to temporal shortage in fuel supply causes shocks or vibrations of the vehicle body.

Therefore, an object of the present invention is to provide a shift shock alleviating apparatus and method for an automatic transmission which is free from the above mentioned problems.

SUMMARY OF THE INVENTION

According to one aspect of the present invention, there is provided a shift shock alleviating apparatus for an automatic transmission drivingly connected to a prime mover, the automatic transmission including a frictional element which is engaged to effect a shift from a first gear to a second gear, the prime mover being compelled to change a revolution speed thereof as the engagement of the frictional element progresses, the apparatus comprising:

means for detecting a command for the shift from the first gear to the second gear and generating a command indicative signal;

means for detecting an actual rate of change in revolution speed of the prime mover and generating an actual rate indicative signal indicative of the actual rate of change in revolution speed of the prime mover;

means for generating a target rate indicative signal indicative of a target rate of change in revolution speed of the prime mover in response to said command indicative signal; and means for controlling an engagement force with which the frictional element is engaged so as to cause the prime mover to change the revolution speed thereof at said target rate of change in revolution speed of the prime mover after a predetermined condition is satisfied after an instance when said command indicative signal is generated.

According to another aspect of the present invention, there is provided a shift shock alleviating method for an automatic transmission drivingly connected to a prime mover, the automatic transmission including a frictional element which is engaged to effect a shift from a first gear to a second gear, the prime mover being compelled to change a revolution speed thereof as the engagement of the frictional element progresses, the method comprising:

detecting a command for the shift from the first gear to the second gear and generating a command indicative signal;

detecting an actual rate of change in revolution speed of the prime mover and generating an actual rate indicative signal indicative of the actual rate of change in revolution speed of the prime mover;

detecting load exerted on the prime mover and generating a load indicative signal;

retrieving a target rate of change in revolution speed of the prime mover versus said load indicative signal in response to the generation of said command indicative signal and generating a target rate indicative signal indicative of a target rate of change in revolution speed of the prime mover; and controlling an engagement force with which the frictional element is engaged so as to cause the prime mover to change the revolution speed thereof at said target rate of change in revolution speed of the prime mover after a predetermined condition is satisfied after an instance when said command indicative signal is generated.

BRIEF DESCRIPTION OF THE DRAWINGS

FIGS. 2A and 2B, when combined, illustrate a hydraulic control system of the automatic transmission with a shift shock alleviating apparatus;

DESCRIPTION OF THE EMBODIMENTS

Hereinafter the embodiments according to the present invention described referring to the accompanying drawings.

Figure 1:
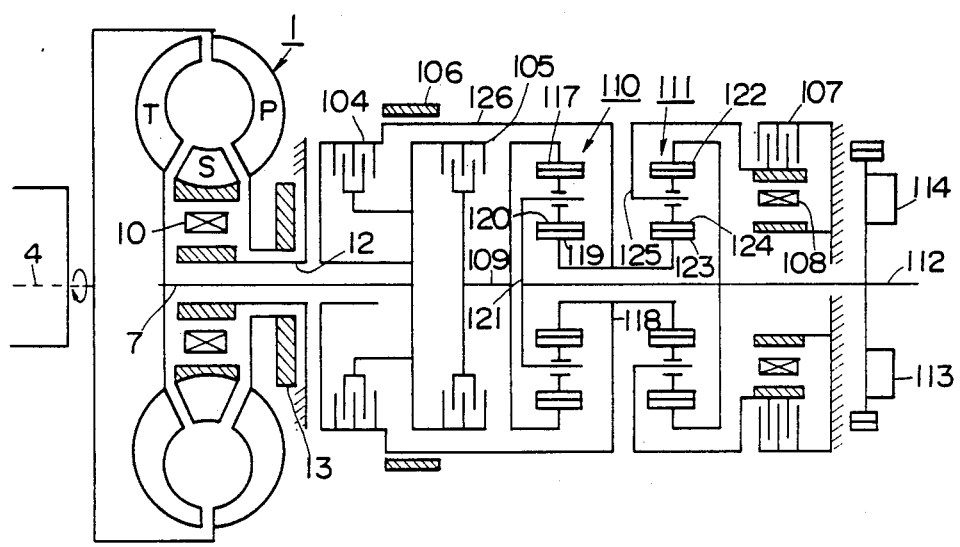
FIG. 1 is a schematic view of a mechanical part of an automotive automatic transmission drivingly connected to a prime mover in the form of an engine.

FIG. 1 shows in schematic a power delivery system of a 3-speed automatic transmission. It comprises a torque converter 1 driven by a crankshaft 4 of an engine, an input shaft or a turbine shaft 7, a front clutch 104, a rear clutch 105, a second brake 106, a low reverse brake 107, a one-way brake 108, an intermediate shaft 109, a first planetary gear unit 110, a second planetary gear unit 111, an output shaft 112, a first governor valve 113, a second governor valve 114, and a pump 13. The torque converter 1 comprises a pump impeller P, a turbine runner T, and a stator S. The pump impeller P is driven by the crankshaft 4 to turn hydraulic working fluid therein, causing the oil to apply a torque to the turbine runner T fixed to the input shaft 7. This torque is transmitted by the input shaft 7 to a change speed planetary gear train. The stator S is mounted on a sleeve 12 via a one-way clutch 10. The one-way clutch 10 allows the stator S to rotate in the same direction as the crankshaft 4 does as indicated by an arrow in FIG. 1 (this rotation is referred to as forward rotation hereinafter), but prevents it from rotating in the reverse direction (this rotation is referred to as a reverse rotation hereinafter). Referring to the change speed planetary gear train, the first planetary gear unit 110 comprises an internally toothed gear 117 fixed to the intermediate shaft 109, a sun gear 119 fixed to a hollow transmitting shaft 118, and at least two planetary pinions 120 meshing with the internally toothed gear 117 and sun gear 119, which pinions 120 are capable of orbiting around the sun gear 119 while turning about their axes, and a planetary pinion carrier 121 supporting the planetary pinions 120, which carrier 121 is fixed to an output shaft 112. The second planetary gear unit 111 comprises an internally toothed gear 122 fixed to the output shaft 112, a sun gear 123 fixed to the hollow transmitting shaft 118, and at least two planetary pinions 124 meshing with the internally toothed gear 122 and sun gear 123, which pinions 124 are capable of orbiting around the sun gear 123 while turning about their axes, and a planetary pinion carrier 125 for supporting the planetary pinions 124. The front clutch 104 is operative to connect the input shaft 7, driven by the turbine runner T, to the hollow transmitting shaft 118, which is integrally rotatable with both sun gears 119 and 123, via a drum 126, whereas the rear clutch 105 is operative to connect the input shaft 7 to the internally toothed gear 117 of the first planetary gear unit 110 via the intermediate shaft 109. The second brake 106 is operative to anchor both sun gears 119 and 123 by gripping the drum 126 fixed to the hollow transmitting shaft 118, whereas the low reverse brake 107 is operative to anchor the pinion carrier 125 of the second planetary gear unit 111. The one-way brake 108 allows the forward rotation of the pinion carrier 125, but prevents the reverse rotation thereof. The first and second governor valves 113 and 114 are operatively connected to the output shaft 112 and produce a governor pressure in response to the vehicle speed.

Now, power delivery paths to be established during operation when a manual speed selector lever is set to a D position (forward drive range) will be explained.

In this case, only the rear clutch 105 which serves as a forward input clutch is engaged. A torque delivered from the engine via the torque converter 1 is transmitted via the input shaft 7 and rear clutch 105 to the internally toothed gear 117 of the first planetary gear unit 110, causing the forward rotation of the gear 117. The forward rotation of the internally toothed gear 117 causes the planetary pinions 120 to rotate in the forward direction. This causes the sun gear 119 to rotate in the reverse direction, and, since the sun gear 123 of the second planetary gear unit 111 which is rotatable with the sun gear 119 rotates in the reverse direction, the planetary pinions 124 of the second planetary gear unit 111 rotate in the forward direction. The one-way brake 108 acts as a forward reaction brake to prevent the sun gear 123 from rotating the pinion carrier 125 in the reverse direction, thus causing the internally toothed gear 122 of the second planetary gear unit 111 to rotate in the forward direction. Accordingly, the output shaft 112 which is rotatable with the internally toothed gear 122 rotates in the forward direction at a reduction ratio for the first forward gear. When, in this state, the vehicle speed increases and the second brake 106 is applied, the power from the input shaft 7 and past the rear clutch 105 is transmitted to the internally toothed gear 117 in the same manner as in the case for the first forward gear. The second brake 106 acts as a forward reaction brake to anchor the drum 126, thus preventing the rotation of the sun gear 119. This causes the planetary pinions 120 to turn about their axes and orbit around the anchored sun gear 119, and the pinion carrier 121 and output shaft 112, which is rotatable with the pinion carrier 121, rotate in the forward direction at a speed which is faster than the speed at which the output shaft 112 rotates at the first forward gear although it is slower than a speed at which the input shaft rotates, thus establishing a reduction ratio for the second forward gear.

As the vehicle speed further increases and when the second brake 106 is released and, in lieu thereof, the front clutch 104 is engaged, a portion of the power transmitted to the input shaft 7 is delivered through the rear clutch 105 to the internally toothed gear 117, while the balance is delivered through the front clutch 104 to the sun gear 119. Thus, the internally toothed gear 117 and sun gear 119 are interlocked and rotate in the forward direction, as a unit, together with both the pinion carrier 121 and output shaft 112 at the same speed, thus establishing the third forward gear. In this case, the front clutch 104 and rear clutch 105 serve as an input clutch and the torque mutiplication is not carried out in the planetary gears, so that none acts as a reaction brake.

Now, a power delivery path when the manual speed selector lever is set to a R position (reverse drive) is explained.

In this case, the front clutch 104 and low reverse brake 107 are applied, the power from the engine and past through the torque converter 1 is delivered from the input shaft 7 to the sun gears 119 and 123 via the front clutch 104 and drum 126. The rear pinion carrier 125 is held stationary by the low reverse brake 107, so that the above mentioned forward rotation of the sun gears 119 and 123 causes the internal toothed gear 122 to rotate at a reduced speed in the reverse direction and a reduction ratio for the reverse drive is given by the output shaft 112 which is rotatable with the internally toothed gear 122.

Figure 2A:
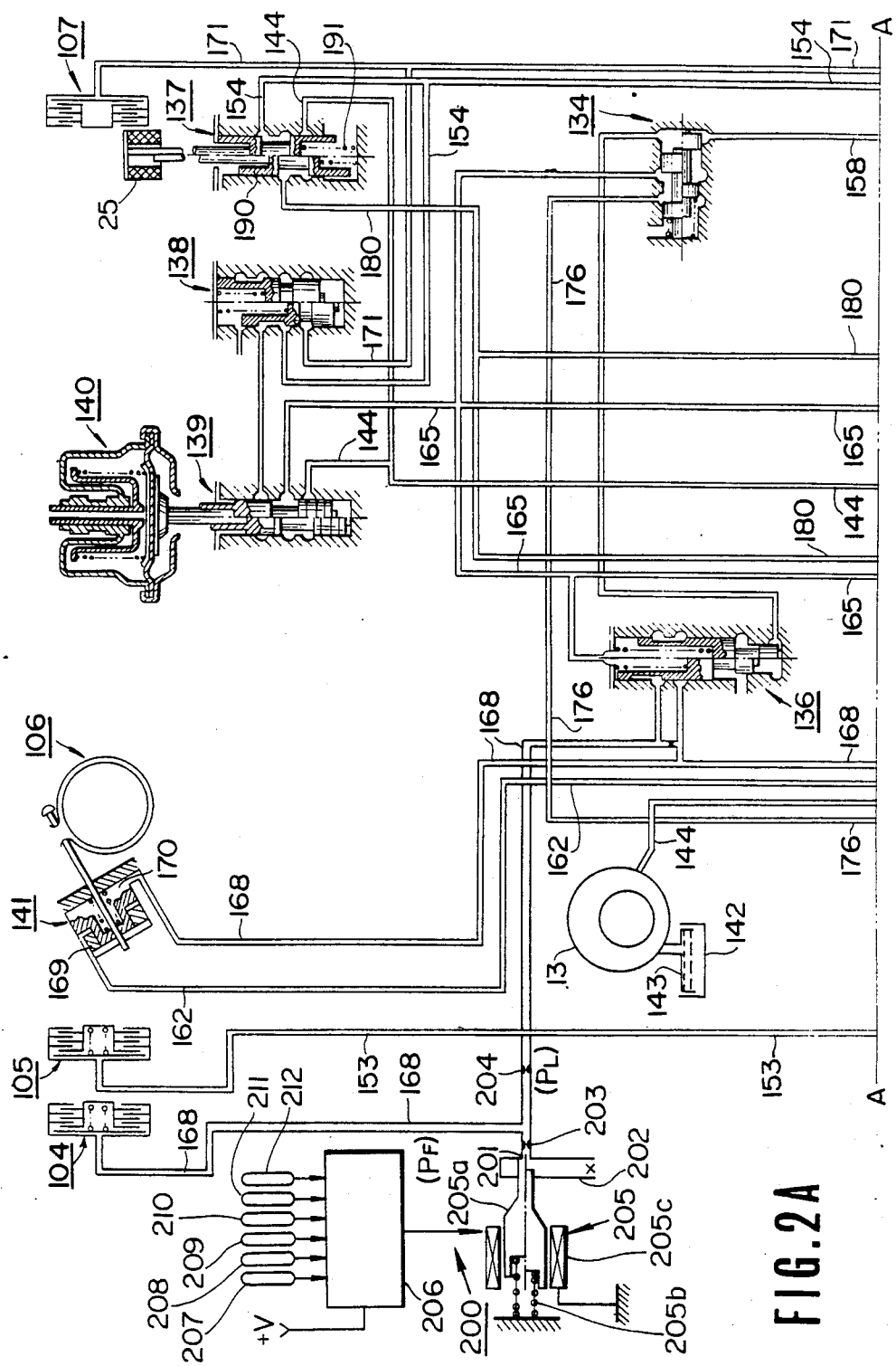

FIG. 2 shows a hydraulic control system for the above-described power delivery system. The hydraulic control system comprises the before mentioned oil pump 13, a line pressure regulator valve 128, a pressure booster valve 129, the torque converter 1, a speed selector valve 130, the first governor valve 113, the second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum disphragm 140, a front clutch 104, a rear clutch 105, a second brake 106, a servo 141, a low-reverse brake 107, and hydraulic pressure network. The pump 13 is driven by the pump impeller P of the torque converter 1 and draws hydraulic fluid from a reservoir 142 through a strainer 143, where harmful dust is removed, during all operating conditions of the engine so as to deliver the fluid to a line pressure circuit 144.

The hydraulic fluid is regulated by the line pressure regulator valve 128 and the thus regulated hydraulic fluid is delivered to the speed selector valve 130 via conduit 144. The line pressure regulator valve 128 comprises a spool 172 and a spring 173, in which, in addition to a bias by the spring 173, the throttle pressure in a circuit 165 and the line pressure in a circuit 156 act on the spool 172 via a spool 174 of the pressure booster valve 129 and these forces are applied to the spool 172 against the line pressure applied from a circuit 144 via an orifice 175 and the pressure from a circuit 176 both acting on upper areas of the spool 172. The hydraulic pressure in the torque converter 1 is maintained at a pressure falling in a certain range by a pressure maintaining valve 146. When the pressure exceeds a certain level, the pressure maintaining valve 146 opens to permit the hydraulic fluid to flow into a circuit 147 toward the rear lubricating section of the power delivery system. When this lubricant pressure is too high, a relief valve 148 opens to bring down a pressure. On the other hand, the lubricant from the circuit 145 is supplied via a front lubrication valve 149 to the front lubricating section of the power delivery system. The speed selector valve 130 is a fluid flow direction switching valve that is manually operable by the manual speed selector lever and it comprises a spool 150 connected to the manual speed selector lever through a linkage so that placing the manual speed selector lever into any desired one of the positions causes the spool 150 to change the connection of the line pressure circuit 144. FIG. 2 shows a state of the speed selector valve 130 when the spool 150 assumes a N (neutral) position. In this state, the line pressure circuit 144 is permitted to communicate with the two ports d and e. The first and second governor valves 113 and 114 produce a governor pressure while the vehicle travels in the forward direction and causes the governor pressure to actuate the 1-2 shift valve 131 and the 2-3 shift valve 132 for effecting an automatic shifting. When the speed selector valve 130 assumes either D, II or I position, the hydraulic pressure is fed from the line pressure circuit 144 to the second governor valve 114 through the port c of the speed selector valve 130. If, under this condition, the vehicle starts to move off from a standstill, the governor pressure regulated by the second governor valve 114 is delivered to a circuit 157 leading to the first governor valve 113, and subsequently when the vehicle speed reaches a predetermined value, the spool 177 of the first governor valve 113 moves to a position wherein the circuit 157 communicates with a circuit 158, admitting the governor pressure thereto. From the circuit 158, the governor pressure acts on the respective end surfaces of the 1-2 shift valve 131, 2-3 shift valve and cut-down valve 134 against the respective springs which urge these valves to the right as viewed in the Figure so as to balance with the corresponding spring forces.

In a hydraulic pressure circuit path leading from the port c of the speed selector valve 130 through a circuit 153, a circuit 161 and a circuit 162, up to an apply side hydraulic pressure chamber 169 of a servo 141 for gripping the second brake 106, the 1-2 shift valve 131 and second lock valve 135 are fluidly disposed, and a circuit 152 leads from the port b of the speed selector valve 130 to the second lock valve 135.

When the speed selector lever is set to D position, the spool 150 of the speed selector valve 130 is moved to a position which provides communication between the line pressure cirucuit 144 and ports a, b and c. From the port a, the hydraulic fluid pressure passes through the circuit 151 to the second lock valve 135 to act on the lower end thereof, thereby to prevent the interruption of the communication between the circuits 161 and 162 which are permitted to communicate with each other when the spool 178 which is urged upward by a spring 179 is pushed down by the oil pressure acting thereon via the circuit 152 from the port b. The hydraulic pressure at the port a is delivered via an orifice 166 and a circuit 167 also to the 2-3 shift valve 132. The hydraulic pressure at the port c is transmitted through a circuit 153 to the second governor valve 114, rear clutch 105, and 1-2 shift valve 131, thereby to establish the first forward speed. When, under this condition, the vehicle speed increases up to a certain value, the governor pressure in the circuit 158 urges the spool 160 to the 1-2 shift valve 131, which is urged to the right by the spring 159, to move to the left, thereby to effect an upshift from the first forward speed to the second forward speed, where the circuit 153 is permitted to communicate with the circuit 161, allowing hydraulic pressure to be delivered through the second lock valve 135 and circuit 162 to the apply side hydraulic pressure chamber 169 of the servo 141 to apply the second brake 106, thus establishing the second forward gear.

When the vehicle speed further increases up to another certain value, the governor pressure in the circuit 158 urges the spool 164 of the 2-3 shift valve 132 to the left overcoming the spring 163, so that the circuit 167 is permitted to communicate with the circuit 168 delivering hydraulic pressure via the circuit 168, to the release-side hydraulic pressure chamber 170 of the servo 141 so as to release the second brake 106 and also to the front clutch 104 to engage same, thus establishing the third forward gear.

When the manual speed selector lever is set to the II position (manual second speed), the spool 150 of the speed selector valve 130 is moved to a position providing communication between the line pressure circuit 144 and the ports b, c and d. The hydraulic pressure at the port b is fed to the same place as in the case of D and the hydraulic pressure at the port c is fed to the rear clutch 105 to engage same. Because, under this condition, the hydraulic pressure does not act on the lower end of the second lock valve 135 and because the lower land has a larger area than the upper land, which lands form a space on the spool 178 opening to the circuit 152, the spool 178 of the second lock valve 135 is pushed down against the force of the spring 178, assuming a position wherein the circuit 152 is permitted to communicate with the circuit 162, permitting the hydraulic pressure to reach the apply side hydraulic pressure chamber 169 of the servo 141 so as to effect application of the second brake 106, thereby establishing the second forward gear. The hydraulic pressure at the port d is delivered via the circuit 154 to the solenoid down shift valve 137 and also to the throttle back-up valve 138. Since the communication between the line pressure circuit 144 leading to the speed selector valve 130 and the port a thereof is prevented, the hydraulic pressure does not pass through the circuit 151 to the 2–3 shift valve 132, thus neither release of the second brake 106 nor the application of the front clutch 104 will take place, so that an upshift to the third forward gear is prevented. As explained, the second lock valve 135 cooperates with the speed selector valve 130 to lock the transmission in the second forward gear. When the manual speed selector lever is set to the I position (manual first forward speed), the line pressure circuit 144 is permitted to communicate with the ports c, d and e. The hydraulic pressure at the port c is delivered to the rear clutch 105 to effect clutch engagement and the hydraulic pressure at the port d is delivered to the same places as in the case of II, whereas the hydraulic pressure at the port e is delivered via the circuit 155, 1–2 shift valve 131 and the circuit 171 to the low-reverse brake 107 so as to apply the low reverse brake 107 which, when applied, acts as a forward reaction brake, thus conditioning the transmission in the first forward speed. The hydraulic pressure at the port e is delivered also to the left end of the 1–2 shift valve 131, pushing the spool 160 to the right in cooperation with the spring 159, thus locking the transmission in the first forward speed.

When a driver depresses an accelerator pedal deeply till the full throttle opening position during running with the D position so as to demand a large acceleration a kickdown switch is turned ON and a downshift solenoid 25 of the solenoid downshift valve 137 is energized because electric current passes therethrough. The energization of the solenoid 25 causes a spool 190 of the solenoid downshift valve 137 to move from a spring set position by a spring 191 downward. In this position, a kickdown circuit 180 is allowed to communicate with the line pressure circuit 144, thus admitting the line pressure to the 1–2 shift valve 131 and the 2–3 shift vavle 132 via the circuit 144 and the circuit 180, urging these valves against the governor pressure. Assuming now that the vehicle is travelling with the third gear when the solenoid 25 is energized, a spool 164 of the 2–3 shift valve 132 is forcibly pushed to move from the leftward position to the rightward position against the governor pressure owing to the line pressure, effecting a forced downshift from the third gear to the second gear as long as the vehicle speed is lower than an upper limit value, thus providing a sufficiently large acceleration. Assuming that the vehicle is travelling with the second gear when the above mentioned kickdown is carried out, the line pressure admitted to the kickdown circuit 180 can push a spool 160 of the 1–2 shift valve 131 also from the leftward position to the right against the governor pressure because in this travelling condition, a heavy load is applied and vehicle speed is low. Therefore, a forced downshift from the second speed to the first speed takes place, providing a larger acceleration matching the heavy load.

According to one embodiment of the present invention, the automatic transmission is provided with an apparatus 200 designed for alleviating or reducing shift shocks occurring when the transmission effects a 2–3 upshift. The apparatus 200 is associated with the circuit 168 communicating with the front clutch 104 because this clutch among all of the the friction elements switches from a released state to an engaged state during a 2–3 upshift, and it is constructed in the following manner.

The apparatus 200 comprises a branch conduit 201 via which a drain circuit 202 is connected to the circuit 168, an orifice 203 provided in the branch conduit 201, and an orifice 204 in the circuit 168. The orifice 204 is disposed upstream of the junction where the branch conduit 201 is connected to the circuit 168. At a junction where the branch conduit 201 is connected to the drain circuit 202, a normally closed solenoid valve 205 is provided so as to close communication between the branch conduit 201 and the drain circuit 202. The solenoid valve 205 has a valve element 205a, a spring 205b and a solenoid 205c. When the solenoid 205c is not energized, the valve element 205a assumes a spring set closed position as illustrated by an upper half thereof under the action of the spring 205b where the fluid communication between the drain conduit 202 and the branch conduit 201 is closed. When the electric current flows through the solenoid 205c, the solenoid 205c is energized to cause the valve element 205a to move against the spring 205b toward an open position as illustrated by a lower half thereof where the fluid communication between the drain conduit 202 and the branch conduit 201 is allowed. The setting of the spring 205b is such that it can hold the valve element 205a in the spring set closed position even when the hydraulic fluid pressure in the circuit 168, which will be identified hereinafter as a front clutch pressure $P_F$, takes a maximum value which is as high as the before mentioned line pressure which will be hereinafter identified as $P_L$. Thus, when the solenoid 205c is not enegized the usual operation of the automatic transmission is ensured.

Figure 3A:
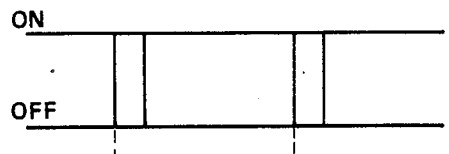
FIGS. 3(a) and 3(b) illustrate two forms of duty factor generated by a computer used in the shift shock alleviating apparatus.
Figure 3B:
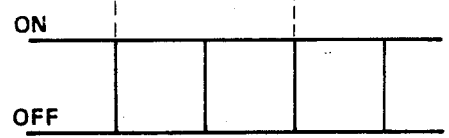
Figure 4:
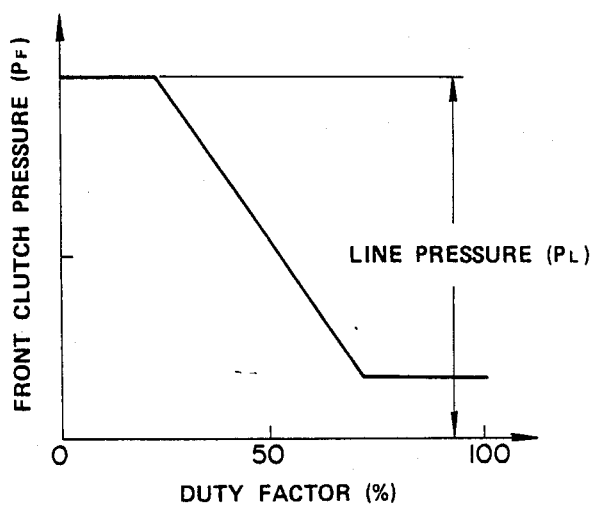
FIG. 4 illustrates how a front clutch pressure ($P_F$) varies versus duty factor (%) of the solenoid.

The duty factor of the current passing through the solenoid 205c is controlled such that the current is allowed to pass during a period of time corresponding to the pulse width of a pulse signal as shown in FIGS. 3(a) and 3(b) supplied by a computer 206. As shown in FIG. 3(a), when the duty factor (%) is small, the front clutch pressure $P_F$, as high as the line pressure $P_L$, is applied to the clutch 104 because the duration when the solenoid valve 205 allows the branch conduit 201 to communicate with the drain circuit 202 is short. As the duty factor (%) increases to become large as shown in FIG. 3(b), the duration when the solenoid valve 205 allows the branch conduit 201 to communicate with the drain circuit 202 becomes long, thus causing a drop in the front clutch pressure $P_F$ as shown in FIG. 4 down to a certain pressure that is determined by a difference, in flow cross section, between the two orifices 203 and 204.

The computer 206 is activated by a power source +V and calculates duty factor upon receipt of numerous input signals including an engine revolution speed indicative signal $S_{ir}$, a torque converter output revolution speed indicative signal $S_{or}$ (a revolution speed of the input or turbine shaft 7) generated by a torque converter output revolution speed sensor 208, a transmission output revolution speed indicative signal $S_o$ (a revolution speed of the output shaft 112) generated by a transmission output revolution speed sensor 209, an engine throttle opening degree indicative signal $S_{TH}$ generated by a throttle opening degree sensor 210, a 1–2 shift indicative signal $S_{12}$ generated by a 1–2 shift switch 211, and a 2–3 shift indicative signal $S_{23}$ generated by a 2–3 shift switch 212.

As described in U.S. Pat. No. 4,431,095 which corresponds to laid-open Japanese Patent Application No. 56-127856, the 1–2 shift switch 211 and 2–3 shift switch 212 are built in the 1–2 shift valve 131 and 2–3 shift valve 132, respectively, such that they are closed when the spools 160 and 164 of the shift valves assume the downshift position, respectively, while they are opened when they assume the upshift position, respectively. Thus, the shift switches 211 and 212 reveal various combinations of ON and OFF states for different gears as shown in the following TABLE. In the TABLE, the character "H" denotes that each of the output signals $S_{12}$ and $S_{23}$ of the shift switches 211 and 212 assume a high level, and the character "L" denotes that it assumes a low level.

TABLE

| SWITCH | GEAR | | |
|---|---|---|---|
| | 1st | 2nd | 3rd |
| 1–2 shift switch | ON(L) | OFF(H) | OFF(H) |
| 2–3 shift switch | ON(L) | ON(L) | OFF(H) |

Therefore, a gear established in the automatic transmission can be identified by checking with which combination, in level, is formed by the output signals $S_{12}$ and $S_{23}$ generated by the shift switches 211 and 212, and a shift command in the automatic transmission can be identified by checking with which one of the signals changes and how.

Figure 5:
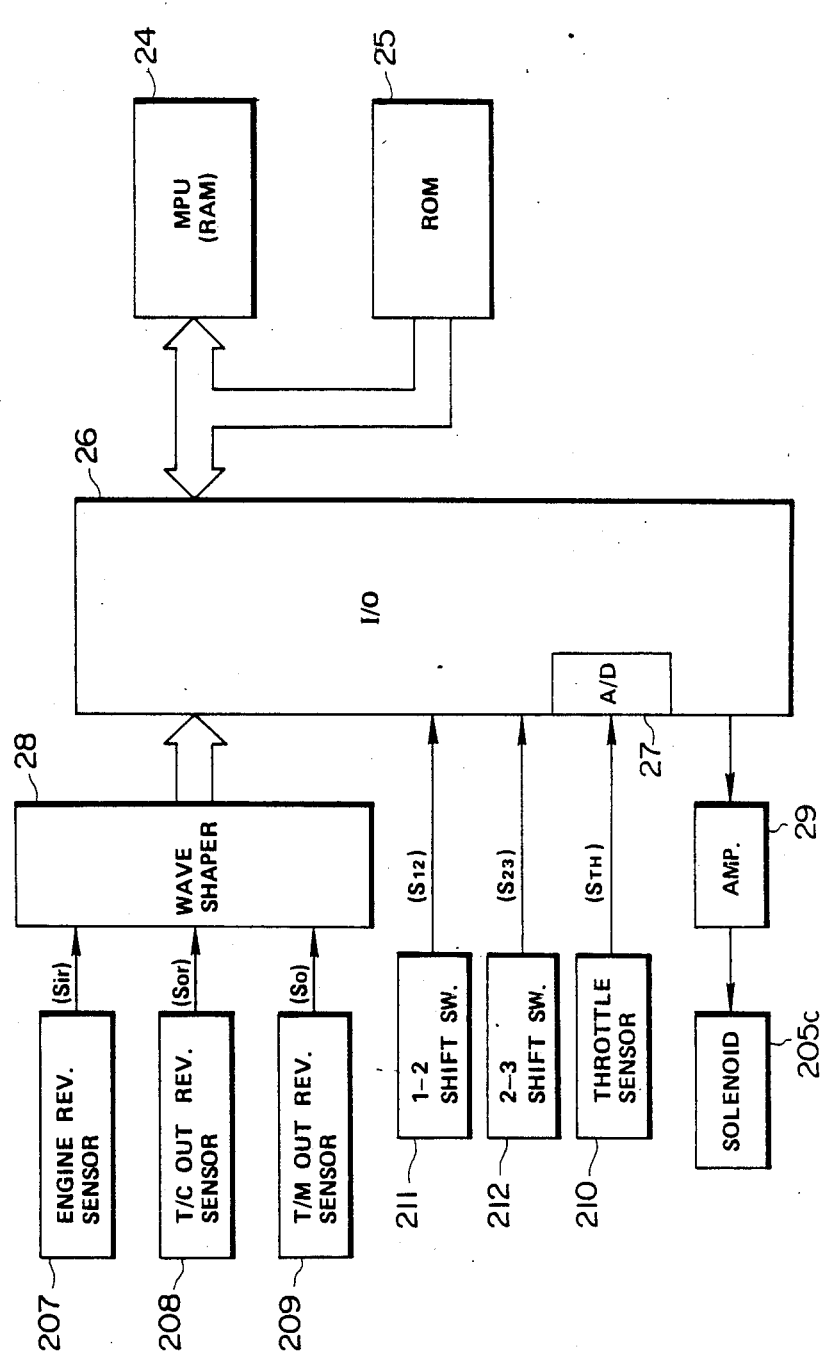
FIG. 5 is a block diagram of the computer.

As shown in FIG. 5, the computer 206 is in the form of a microcomputer which comprises a microprocessor unit (MPU) 24 including a random access memory (RAM), a read only memory (ROM) 25, an input/output interface circuit (I/O) 26, an analog to digital (A/D) converter 27, a wave shaper 28, and an amplifier 29. The computer 206 executes a control program shown in FIGS. 6 to 9.

Figure 6:
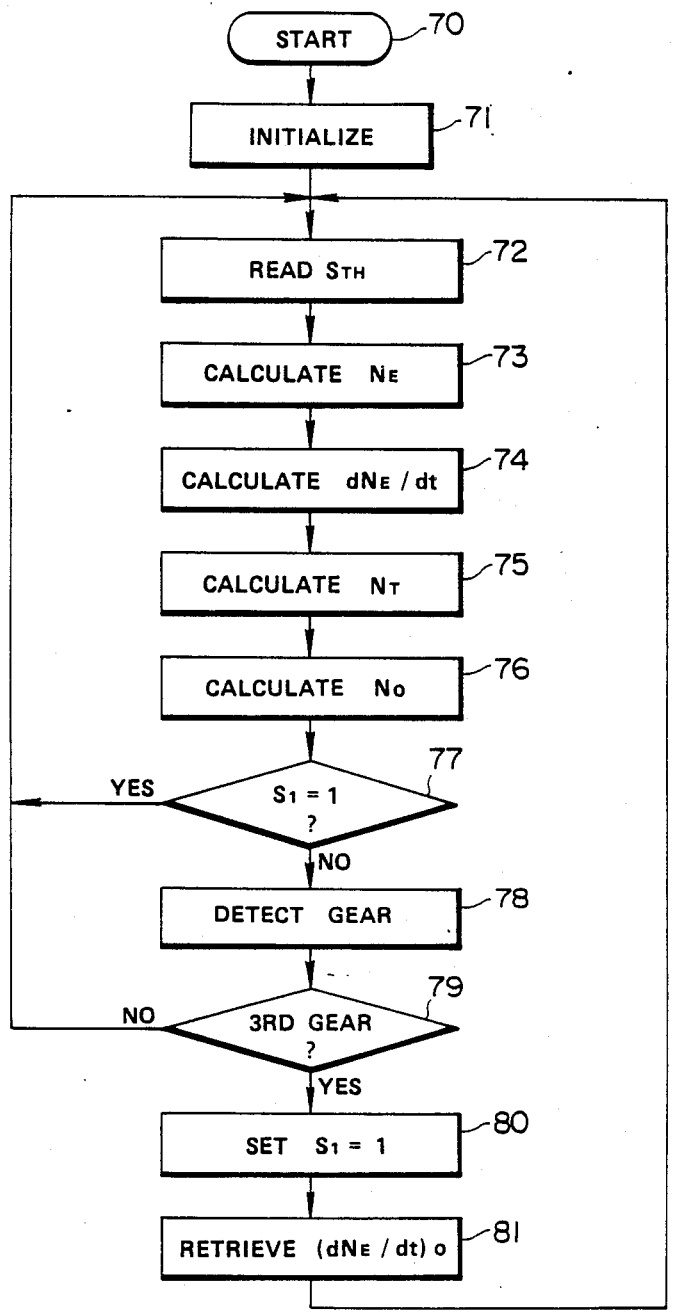
FIG. 6 is a flowchart of a main routine of a control program stored in the computer.
Figure 7:
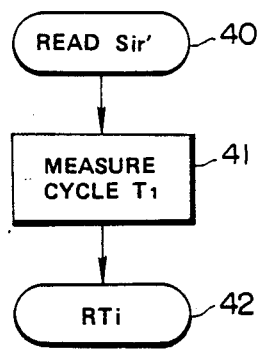
FIG. 7(a) is a flowchart used to explain a step 73 of the main routine.
FIG. 7(b) is a timing diagram.
Figure 7:
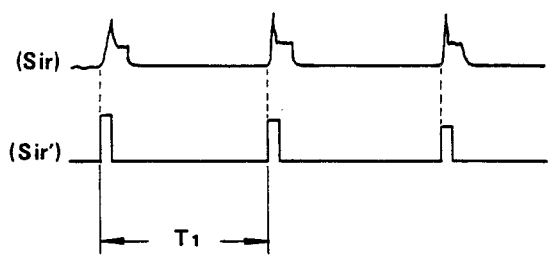
Figure 8:
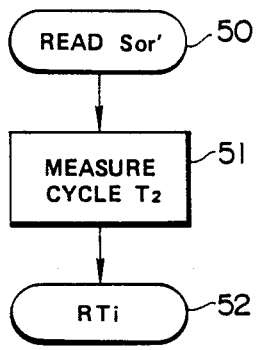
FIG. 8(a) is a flowchart used to explain a step 75 of the main routine.
FIG. 8(b) is a timing diagram.
Figure 8:
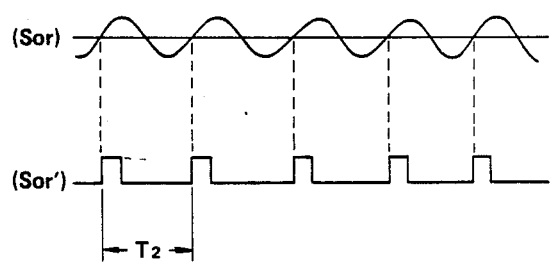

Referring to FIG. 6, a main routine of a control program stored in the ROM 25 is described. The execution of this main routine starts with a step 70 when the ignition switch of the engine is turned on. In a step 71 which follows, the MPU 24 and I/O 26 are initialized. Then, the control goes to a step 72 where the MPU 24 reads the throttle opening degree indicative signal $S_{TH}$ generated by the sensor 210 via the I/O 26 after the signal $S_{TH}$ has been converted into a digital signal by the A/D converter 27.

Subsequently the control goes to a step 73 where the main routine is interrupted and the MPU 24 is allowed to execute an interruption routine as shown in FIG. 7(a) where based on the engine revolution speed indicative signal $S_{ir}$ generated by the sensor 207 the engine revolution speed $N_E$ is calculated. The sensor 207 detects the ignition signal of the engine and generates the signal $S_{ir}$ as shown in FIG. 7(b). The signal $S_{ir}$ is processed by the wave shaper 28 where the noise is eliminated into a rectangular shaped signal $S_{ir'}$ which rises upon generation of the ignition signal. The rise in the signal $S_{ir'}$ initiates the execution of the interruption routine shown in FIG. 7(a) where the rise in the signal $S_{ir'}$ is read via the I/O 26 and then a cycle $T_1$, i.e., a difference in time between the step 41 in the present run and that in the previous run is measured in a step 41 and then the engine revolution speed $N_E$ calculated using this measured cycle $T_1$. Thereafter, the control proceeds to a step 42 where the control returns to the main routine.

Referring again to FIG. 6, a step 74 is executed where an actual rate of change in revolution speed of the engine $dN_E/dt$ is calculated based on an engine revolution speed $N_E$(OLD) obtained in a previous run and an engine revolution speed $N_E$(NEW) obtained at present using the following equation, $$\frac{dN_E}{dt} = \frac{N_E(\text{NEW}) - N_E(\text{OLD})}{T_o}$$

where:
$T_o$ represents a cycle between which the engine revolution speed is calculated in the step 73.

In the next step 75, the MPU 24 calculates an output revolution speed $N_T$ of the torque converter 1 by executing an interruption routine shown in FIG. 8(a) based on the converter output revolution speed indicative signal $S_{or}$ generated by the sensor 208. The sensor 208 is mounted to the input shaft 7, for example. It includes a sign wave generator which generates a signal $S_{or}$ as the input shaft 7 rotates. This signal $S_{or}$ triggers the wave shaper 28 so as to cause it to produce a rectangular wave signal $S_{or'}$ as shown in FIG. 8(b) whenever it exceeds the threshold level. The rise in the rectangular wave signal $S_{or'}$ causes the MPU 24 to initiate the execution of the interruption routine shown in FIG. 8(a). First of all, a step 50 is executed where the signal $S_{or'}$ is read via the I/O 27. In the subsequent step 51, a cycle $T_2$ is measured in terms of a diffrnece in time between the previous execution of the interruption routine and the present execution thereof. The MPU 24 calculates the output revolution speed of the torque converter 1 based on the cycle $T_2$. Thereafter, the control goes to a step 52 where the control returns to the main routine shown in FIG. 6.

Referring to FIG. 6, an output revolution speed $N_0$ of the transmission is calculated in step 76 using the output revolution speed indicative signal $S_o$ generated by the sensor 209. The sensor 209 is similar in construction to the sensor 208. The revolution speed of the output shaft $N_0$ of the transmission is determined by executing an interruption routine similar to that shown in FIG. 8(a).

In the subsequent step 77, a decision is made whether or not a third gear judging flag $S_1$ is set at 1, the fact that the flag $S_1$ is set at 1 indicates that the third gear is demanded by the automatic transmission. When, in the previous run, the third gear was selected and the flag $S_1$ has been set at 1 ($S_1=1$), the control returns to the step 72. When, in the previous run, the third gear was not demanded and thus the flag $S_1$ is not set at 1, the control goes to the step 78 and then to step 79. With the execution of the steps 78 and 79, a decision is made whether or not a shift to the third gear is demanded. That is, the step 78 is executed to detect which gear is about to be established by checking with which combination in level of the signals $S_{12}$ and $S_{23}$, generated by the switches 211 and 212, is made, and then the subsequent step 79 is executed where a decision is made whether or not the third gear is detected. When the decision in the step 79 determines that the third gear is not demanded, the control returns to the step 72. When the decision in the step 79 determines that the third gear is demanded, the control goes to a step 80 where the third gear judging flag $S_1$ is set at 1. It will now be understood that the flag $S_1$ will be set at 1 upon the occurrence of a demand for a shift to the third gear. In the subsequent step 81, the MPU 24 retrieves a target rate of change in revolution speed of the engine $(dN_E/dt)_0$ by a table look-up of a table stored in the ROM 25. The data to be contained in the table relate to a rate of change in revolution speed of the engine which has been predetermined for each amount of load exerted on the engine as represented by a throttle opening degree, for example, so as not to cause the occurrence of shift shocks during a shift to the gear detected in the step 78, and the content of the data differs from one type of engine to another and one type of transmission to another. Therefore, the target rate of change in revolution speed of the engine is obtained by table look-up for the gear detected in the step 78 and the throttle opening degree obtained in the step 72. Thereafter, the control returns to the step 72.

Figure 9A:
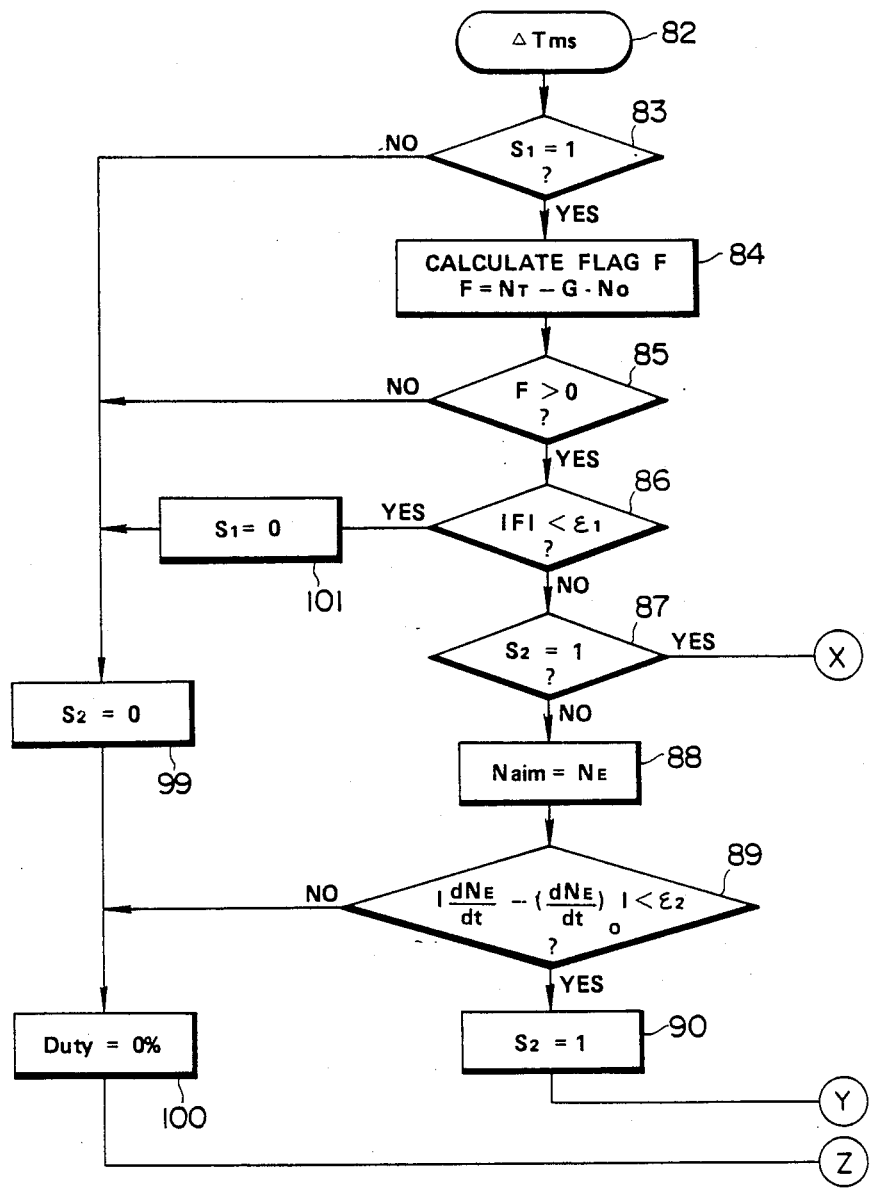
FIGS. 9A and 9B when combined illustrate a flowchart of an interruption routine of the control program.
Figure 9B:
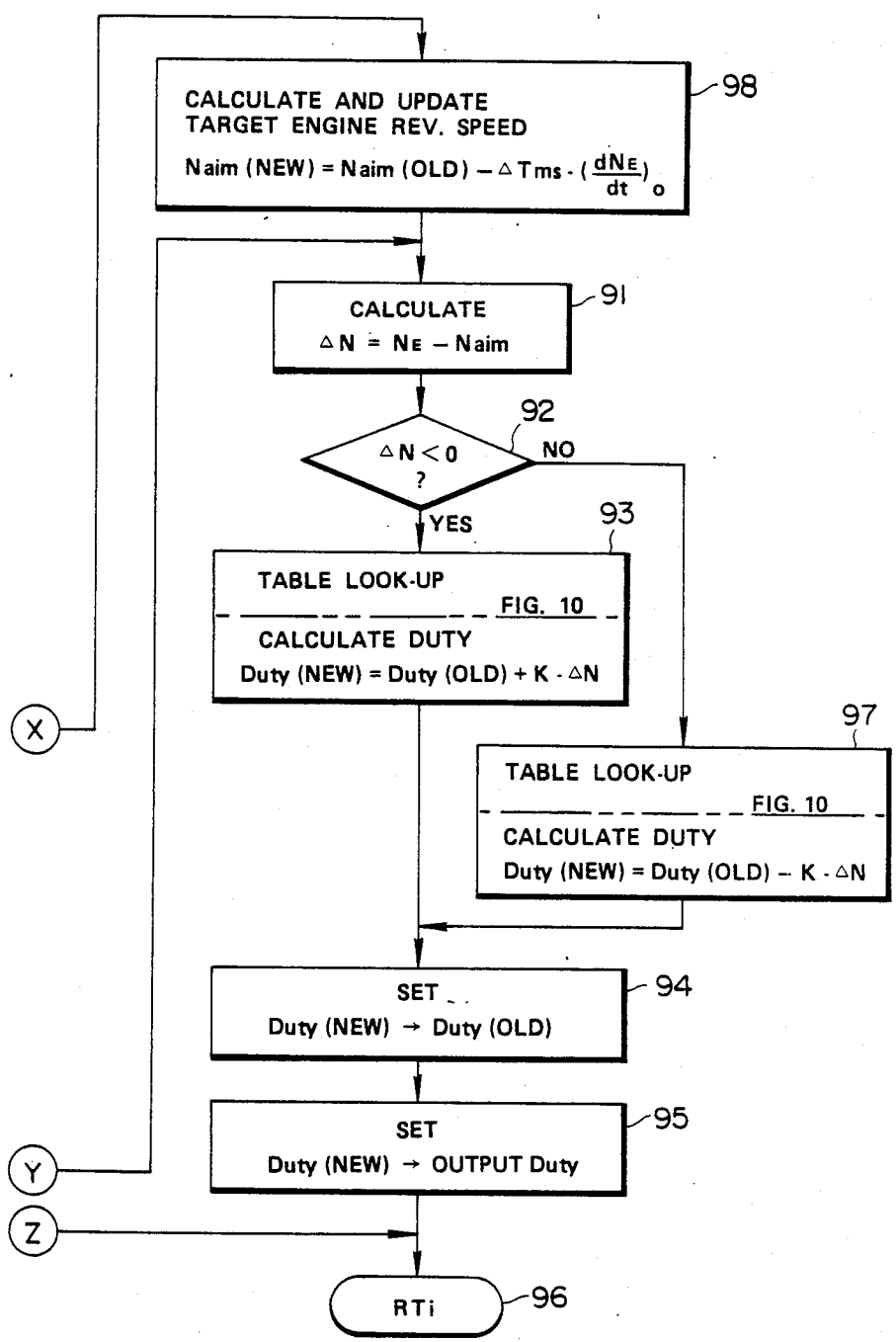

Referring to FIG. 9, the interruption routine is caused to be executed by an interruption signal generated by a timer (not illustrated) at a preset interval $\Delta$Tms and begins with a step 82. First of all, a decision is made in a step 83 whether or not the third gear judging flag $S_1$ is set at 1. When the decision determines that the flag $S_1$ is equal to 1, the step 84 is selected where a gear ratio G for the gear detected in the step 78 shown in FIG. 6 is read from the table data, the gear ratio G is multiplied with the transmission output revolution speed $N_0$ calculated in the step 76 to provide the output revolution speed of the torque converter $(G \times N_0)$, and this result is substracted from the actually measured torque converter output revolution speed $N_T$ to provide a shift completion judging flag F, $$F = N_T - G \cdot N_0.$$

The flag F is equal to 0 when the front clutch 104, i.e., a friction element to be engaged in the third gear, is firmly engaged upon completion of the shift, because a slip in the front clutch 104 is eliminated and $N_T = G \cdot N_0$ holds. Thus, since the front clutch 104 is subjected to slip, the flag F is not equal to 0 during the shifting operation. When an upshift to the third gear progresses (a 2-3 upshift) where the front clutch 104 switches from a non-activated state to an activated state, the flag F stays greater than 0 because $N_T$ is greater than $G \cdot N_0$ owing to the difference in gear ratio before and after the upshift. If the automatic transmission has another gear above the third gear, the flag F will stay less than 0 during a downshift to the third gear.

In the subsequent step 85, a decision is made whether or not the shift completion judging flag F is positive, i.e., whether or not the 2-3 upshift is underway. When the decision determines that the shift is underway, a step 86 is selected where a decision is made whether or not the absolute value of the flag F (i.e., $|F|$) is less than a predetermined small value $\epsilon_1$ so as to make a decision whether or not the upshift has been completed. In this case, the predetermined small value $\epsilon_1$ is set at a value other than zero with which the absolute of the flag F is compared in determining whether or not the shift operation has been completed because F=0 does not virtually hold even when the shift operation has been completed due mainly to a calculation error or a small difference between the instance when the torque converter output revolution speed $N_T$ is detected and the instance when the transmission output revolution speed $N_0$ is detected.

When the relationship $|F| < \epsilon_1$ does not hold, i.e., when the 2-3 upshift is underway, the control goes to a step 87 where a decision is made whether or not a control commencement judging flag $S_2$ is set at 1. Initially, the control has not begun so that a step 88 is selected where a target engine revolution speed Naim is given the engine revolution speed $N_E$ obtained in the step 73. In the next step 89, a decision is made whether or not the actual rate of change in engine revolution speed $dN_E/dt$ obtained in the step 74 is substantially equal to the target rate of change in engine revolution speed $(dN_E/dt)_0$, i.e., whether or not the control should be initiated. That is, in this step 89, a decision is made whether or not $|dN_E/dt - (dN_E/dt)_0|$ is less than another predetermined small value $\epsilon_2$. When the decision determines that the answer is YES, the control goes to a step 90 where the control commencement judging flag $S_2$ is set at 1.

In a step 91 that follows, a deviation $\Delta N$ of the engine revolution speed $N_E$ from the target engine revolution speed Naim is calculated.

Initially, the following equation is calculated in the step 91 with the target engine revolution speed Naim set at the value obtained in the step 88, $$\Delta N = N_E - Naim.$$

Subsequently, in a step 92, a decision is made whether or not the deviation $\Delta N$ is less than zero, i.e., whether or not the deviation $\Delta N$ is negative. Since, initially, the result of the calculation in the step 91 reveals that $\Delta N$ is equal to 0, the decision in the step 92 results in a selection of a step 97 which is followed by steps 94, 95 and 96. However, after the sucessive execution of instructons along the steps 87, 98, 91, 92, 97, 94, 95 and 96, (discussed below) the calculation of $\Delta N$ in the step 91 will reveal a value other than zero.

When the decision determines that $\Delta N$ is less than zero ($\Delta N < 0$), i.e., when the engine revolution speed $N_E$ is lower than the target engine revolution speed Naim, the control goes to a step 93 where an output duty is increased by calculating an equation as follows:

$$Duty(New) = Duty(OLD) + K \cdot \Delta N.$$

Duty(OLD) is replaced with Duty(NEW) in the next step 94. Then, Duty(NEW) is generated as the output duty to the solenoid 205c via the amplifier 29 (see FIG. 5). In the equation as above, Duty(NEW) expresses an output duty updated, Duty(OLD) a present output duty, and K is a porportional constant (a feedback coefficient). After the step 95, the control goes to a step 96 where the execution of the main routine shown in FIG. 6 is caused.

It will now be understood that since the output duty has been replaced with the increased duty value Duty(-NEW), the solenoid valve 205 causes a decrease in the front clutch pressure $P_F$ as readily understood from FIG. 4, causing a decrease in gripping or engaging force with which the front clutch 104 is engaged, thus allowing the engine to increase its speed $N_E$ toward the target value Naim.

Figure 10:
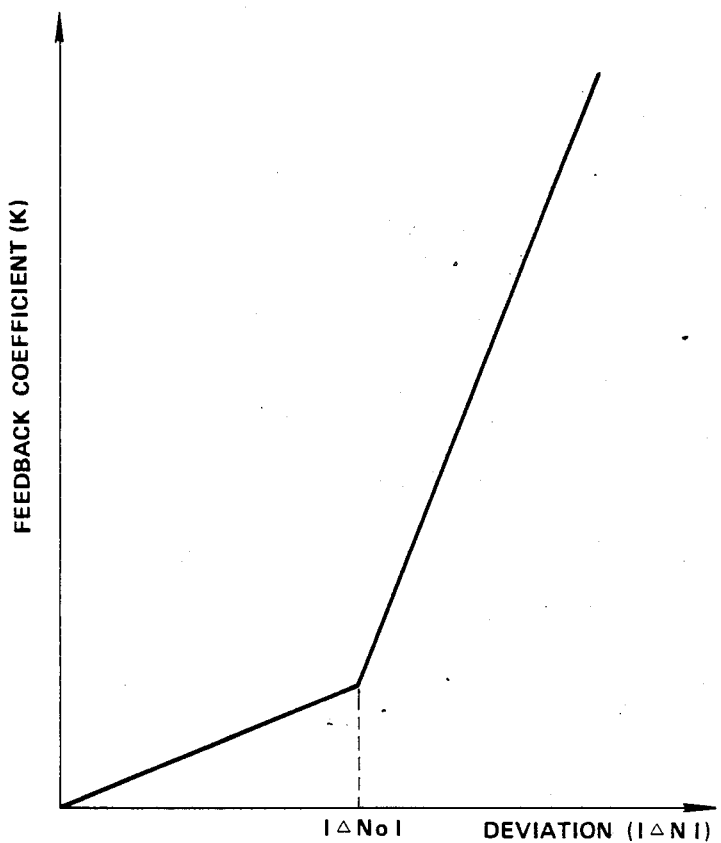
FIG. 10 is a map illustrating how a feedback coefficeint (K) varies versus an absolute value of a deviation of actual engine revolution speed from a target engine revolution speed.

The feedback coefficient K should vary as shown in FIG. 10 where it varies at a large rate against the deviation ($\Delta N$) when the absolute value of the deviation is larger than a predetermined value $|\Delta N_0|$, whereas it varies at a small rate when the absolute value of the deviation ($\Delta N$) is less than the predetermined value $|\Delta N_0|$. With the coefficient K varying as shown in FIG. 10, the engine is allowed to quickly change its engine speed $N_E$ toward the target value Naim when the deviation $\Delta N$ is large, thus providing a good control gain, whereas when the deviation $\Delta N$ is small, the occurrence of hunting of the engine revolution speed $N_E$ is prevented, thus providing a stable control. The appropriate value of the coefficient K is determined in the step 93 by a table look-up of a map stored in the ROM 25 and shown in FIG. 10 for the deviation $\Delta N$ determined in the step 91.

When the decision in the step 92 determines that $\Delta N$ is greater than or equal to zero ($\Delta N \geq 0$), i.e., when the engine revolution speed $N_E$ is greater than or equal to the target engine revolution speed Naim, the control goes to a step 97 where the coefficient K is determined for the deviation $\Delta N$ by table look-up of the map shown in FIG. 10 and then the output duty is decreased by calculating the following equation:

$$Duty(NEW) = Duty(OLD) - K \cdot \Delta N.$$

The result of the calculation is supplied to the solenoid 205c in the step 95 after executing the step 94. In this case, since the output duty has been decreased, the solenoid valve 205 causes an increase in the front clutch pressure $P_F$ as readily understood from FIG. 4, causing an increase in gripping force with which the front clutch 104 is engaged, thereby causing the engine to decrease its speed $N_E$ toward the target value Naim.

When the program shown in FIG. 9 is executed after the initial run which has been described, since the flag $S_2$ is set at 1, the decision in the step 87 selects the step 91 where the target engine revolution speed Naim(-NEW) is calculated by the following equation;

$$Naim(NEW) = Naim(OLD) - \Delta Tms(dN_E/dt)_0,$$

where:
Naim(NEW) represents a new target engine revolution speed, and
Naim(OLD) a target engine revolution speed set in the previous run.

From this equation, it will be understood that the target engine revolution speed is decreased by a value proportional to the target rate of change in engine revolution speed $(dN_E/dt)_0$ upon lapse of the interval $\Delta Tms$. Therefore, in calculating the deviation $\Delta N$ in the step 91, Naim(NEW) is used as Naim. This means that the engine is caused to vary its revolution speed $N_E$ at the rate expressed by the target rate of change in engine revolution speed $(dN_E/dt)_0$.

When the decision in the step 83 determines that the flag $S_1$ is not equal to 1, i.e., when the decision determines that the shift to the third gear is not demanded in the automatic transmission, the control goes to a step 99 where the flag $S_2$ is reset to 0 and then the output duty is set at 0% in a step 100. When the decision in the step 85 determines that the flag F is equal to zero or less than zero (i.e., when a downshift has been completed or the downshift is underway although there is no possibility in this embodiment that the downshift to the third gear takes place), the control goes the steps 99 and 100. When the decision in the step 86 determines that $|F|$ is less than $\epsilon_1$ (i.e., when the decision determines that 2–3 upshift has been completed), a step 101 is executed where the third gear judging flag $S_1$ is reset to 0 in order to let the program shown in FIG. 6 to select the step 80 where the flag $S_1$ is set at 1. After the step 101, the steps 99 and 100 are executed. When the answer to the decision in the step 89 is NO (i.e., the rate of change in actual engine revolution speed $dN_E/dt$ has not substantially agreed with the target rate of change in engine revolution speed $(dN_E/dt)_0$ yet although the 2–3 upshift is underway and thus the following control should not be initiated), the control goes to the step 100. In each of the above mentioned cases, the output duty is set at 0% and thus the solenoid valve 205 is closed so that the front clutch pressure $P_F$ is not modified and remains as high as the level determined by the hydraulic control system shown in FIG. 2.

Figure 11:
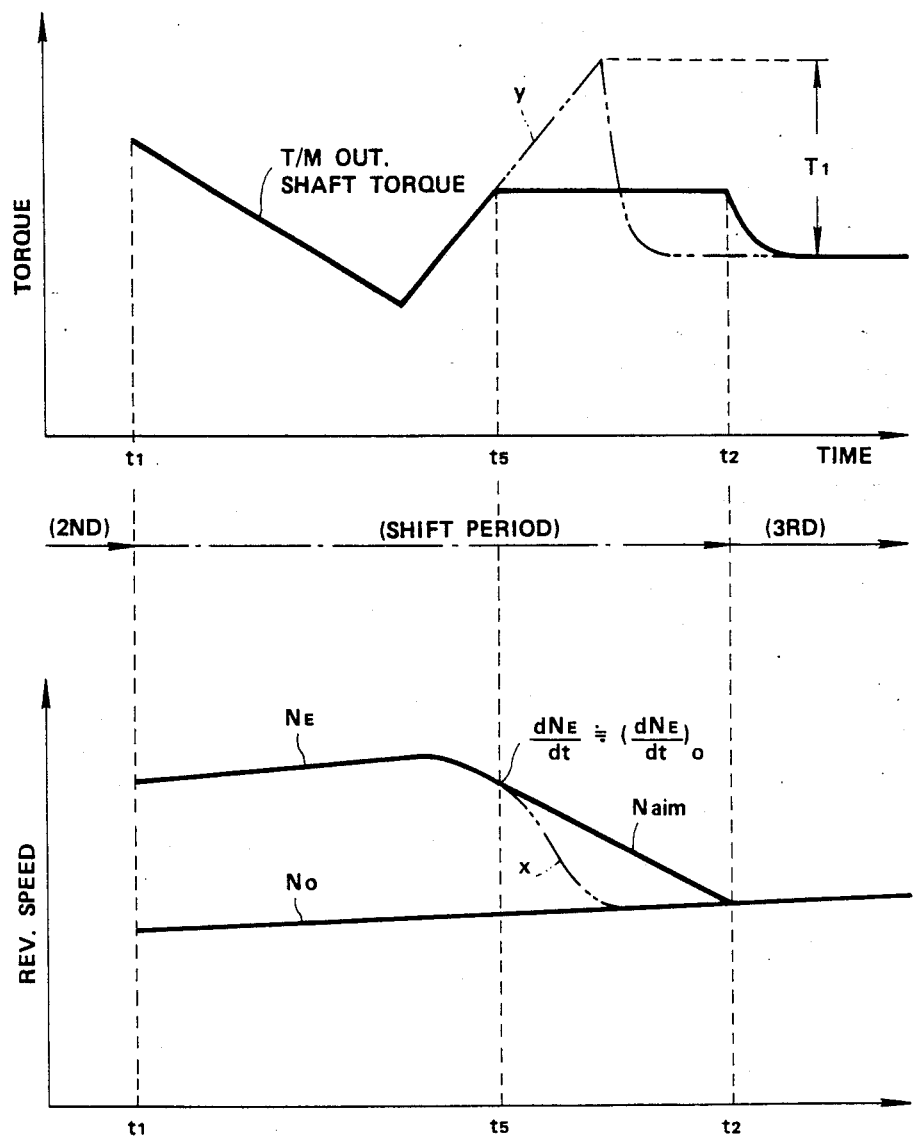
FIG. 11 is a timing diagram illustrating a 2-3 shift.

As a result of repeating the control programs thus far described, the engine revolution speed is varied such that the deviation $\Delta N$ between the engine revolution speed $N_E$ and the target engine revolution speed Naim decreases toward zero under the control of the output duty that is corrected after lapse of the predetermined interval $\Delta Tms$. It follows that the engine revolution speed drops at the target rate of change in engine revolution speed $(dN_E/dt)_0$ and thus along the varying characteristic of the target engine revolution speed Naim after the instance $t_5$ when a predetermined condition where the actual rate of change in engine revolution speed $dN_E/dt$ becomes substantially equal to the target rate of change in engine revolution speed $(dN_E/dt)_0$ after the instance $t_1$ when the command for the 2–3 shift is generated (see FIG. 11). As a result, the torque resulting from combining the inertia of the engine with the driving force produced by the engine is delivered at a certain gradual rate to the transmission output shaft during the period between $t_5$ and $t_2$ where shocks are otherwise would liable to occur in effecting the 2–3 upshift. As a result, there is obtained the transmission output torque varying as shown by the fully drawn line, which is free from a peak torque y as shown in FIG. 11, thereby to alleviate substantial shocks in effecting the 2–3 upshift. Referring to FIg. 11, it is illustrated that the transmission output revolution speed $N_0$ agrees with the target engine revolution speed Naim after the instance $t_2$ for ease of explanation even though there is actually a difference between them due to the presence of a slip in the torque converter.

Figure 12:
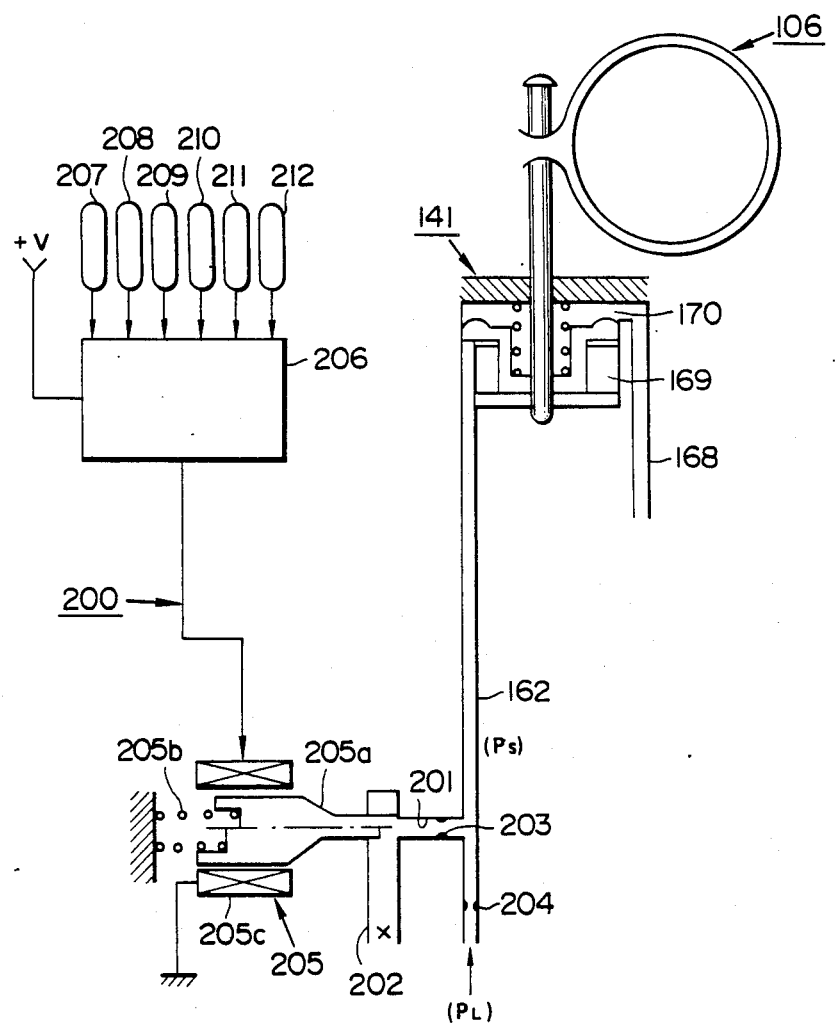
FIG. 12 is a fragmentary view of a second embodiment wherein the present invention is applied to a frictional element which is engaged in effecting a 1-2 upshift.

FIG. 12 illustrates another embodiment according to the present invention which is designed to alleviate substantial shocks in effecting 1–2 upshift. As will be readily understood from the discussion before, the second brake 106 is engaged by the line pressure supplied via the circuit 162 in effecting the 1–2 upshift. Thus, according to this embodiment, an apparatus 200 which is substantially the same as that used in the first embodiment is connected to the circuit 162. However, a control program used in this embodiment is slightly different from the counterpart used in the first embodiment in that the flag $S_1$ seen in FIGS. 6 and 9A is used as a flag for judging whether or not the second gear is demanded, and the content of the step 79 is rewritten as a decision whether or not the second gear is demanded.

Figure 13:
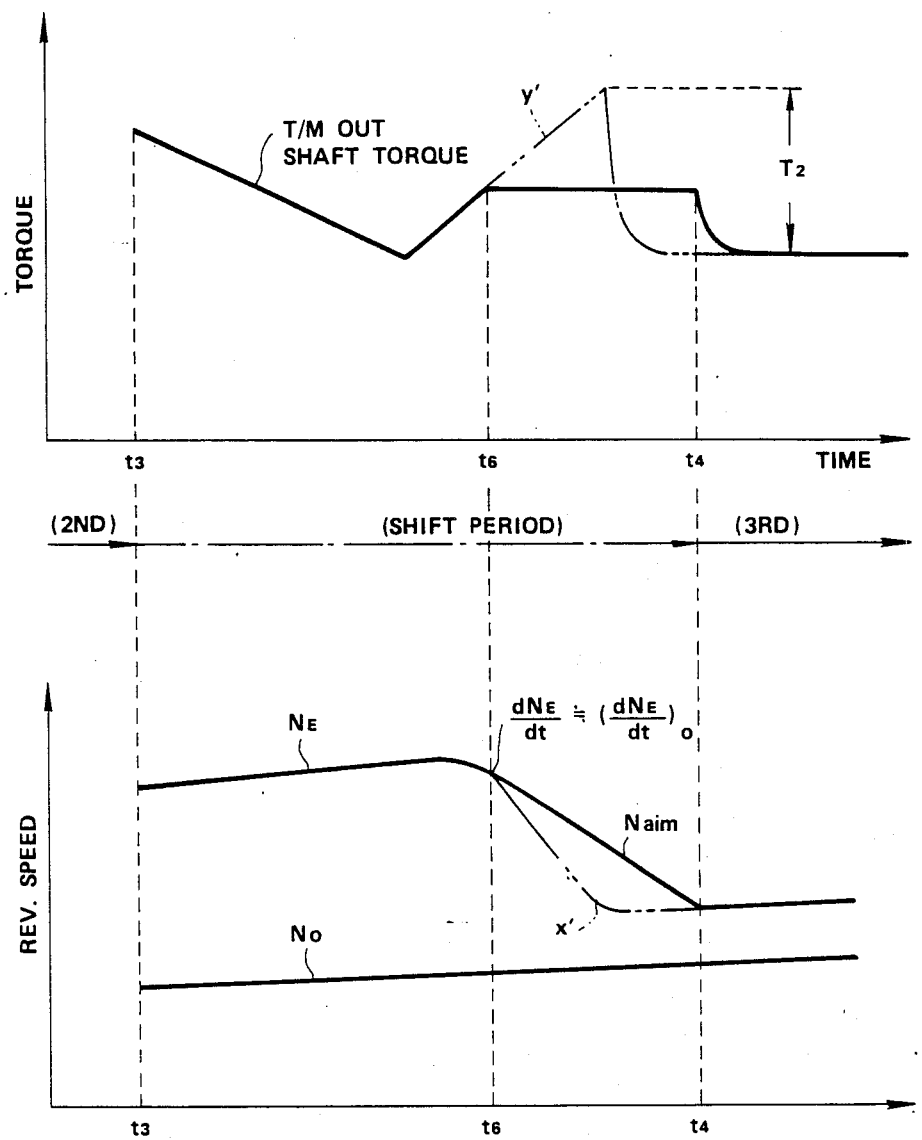
FIG. 13 is a timing diagram illustrating the 1-2 upshift.

As will be understood from FIG. 13, the engine revolution speed is decreased at the target rate of change in engine revolution speed $(dN_E/dt)_0$ after an instance $t_6$ when the actual rate of change in engine revolution speed $dN_E/dt$ substantially agrees with the target rate of change in engine revolution speed $(dN_E/dt)_0$ in effecting the 1-2 upshift. Thus, the engine revolution speed is decreased along the target engine revolution speed Naim. This alleviates substantial shocks during the 1-2 upshift (see the fully drawn torque curve which is free from the peak torque y'). Similarly to FIG. 11, it is illustrated in FIG. 13 that the transmission output revolution speed $N_0$ agrees with the target engine revolution speed Naim after the instance $t_2$ for ease of explanation even though there is actually a difference between them due to the presence of a slip in the torque conveter 1.

Although, in the embodiments above, the actual rate of change in engine revolution speed is obtained using the engine revolution speed indicative signal generated by the engine revolution speed sensor 207, the rate of change in engine revolution speed can be obtained without using this sensor 207 by processing the torque converter output revolution speed indicative signal generated by the torque converter output revolution speed sensor 208.

What is claimed is:

1. A shift shock alleviating apparatus for an automatic transmission drivingly connected to a prime mover, the automatic transmission including a frictional element which is engaged to effect a shift between different gears, the apparatus comprising:
    means for detecting a command for the shift and generating a command indicative signal;
    means for determining actual revolution speed of the prime mover, calculating an actual rate of change in revolution speed of the prime mover,
    determining a target rate of change in revolution speed of the prime mover after said command indicative signal has been generated, calculating a target revolution speed of the prime mover as a function of said target rate of change, calculating a deviation of said actual revolution speed from said target revolution speed, and generating an output signal variable as a function of said deviation after said actual rate of change has substantially equaled said target rate of change; and
    means for controlling an engagement force with which the frictional element is engaged in response to said output signal.

2. An apparatus as claimed in claim 1, further comprising:
    means for detecting load exerted on the prime mover and generating a load indicative signal; and
    wherein said calculating means retrieves the target rate of change in revolution speed of the prime mover versus said load indicative signal upon generation of said command indicative signal.

3. An apparatus as claimed in claim 1, wherein said engagement force controlling means includes a solenoid valve means for regulating fluid pressure supplied to the frictional element with which said engagement force is variable.

4. A shift shock alleviating method for an automatic transmission drivingly connected to a prime mover, the automatic transmission including a frictional element which is engaged to effect a shift between different gears, the method comprising the steps of:
    detecting a command for the shift and generating a command indicative signal;
    determining an actual revolution speed of the prime mover;
    calculating an actual rate of change in revolution speed of the prime mover;
    detecting load exerted on the prime mover and generating a load indicative signal;
    retrieving a target rate of change in revolution speed of the prime mover versus said load indicative signal upon generation of said command indicative signal;
    calculating a target revolution speed of the prime mover as a function of said target rate of change;
    calculating a deviation of said actual revolution speed from said target revolution speed;
    generating an output signal variable as a function of said deviation after said actual rate of change has become substantially equal to said target rate of change; and
    controlling an engagement force with which the frictional element is engaged in response to said output signal.

5. In an automatic transmission for an automotive vehicle having an engine, the transmission including a frictional element and being shiftable from one gear down to another gear involving engagement of the frictional element;
    means for detecting a command for shifting from the one gear down to the other gear and generating a command indicative signal;
    means for supplying hydraulic fluid to the frictional element after said command indicative signal has been generated to cause a rise in hydraulic servo pressure with which the frictional element is engaged to initiate a shifting operation;
    means for carrying out a closed loop control of said hydraulic servo pressure after an actual rate of change in revolution speed of the engine has become substantially equal to a predetermined target rate of change in revolution speed of the engine until said shifting operation is completed, said closed loop control involving varying said hydraulic servo pressure such that said actual rate of change in revolution speed of the engine stays in agreement with said predetermined target rate of change in revolution speed of the engine during said shifting operation.

* * * * *